(No Model.) 2 Sheets—Sheet 1.

E. JARRELL.
VEHICLE SPRING.

No. 411,286. Patented Sept. 17, 1889.

Witnesses:
Jas. E. Hutchinson
G. F. Downing

Inventor:
Edwin Jarrell
By H. A. Seymour
Atty.

(No Model.) 2 Sheets—Sheet 2.
E. JARRELL.
VEHICLE SPRING.
No. 411,286. Patented Sept. 17, 1889.
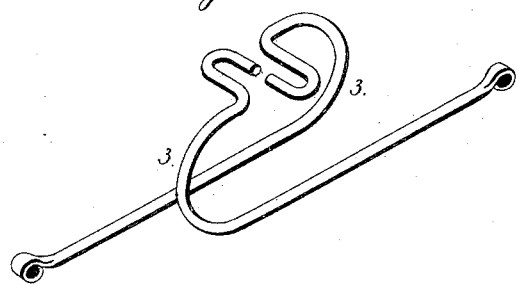
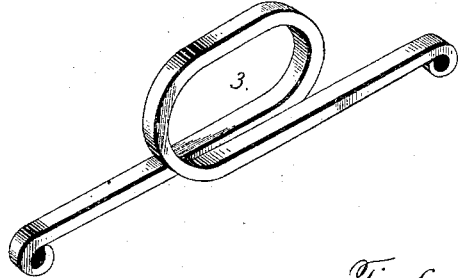
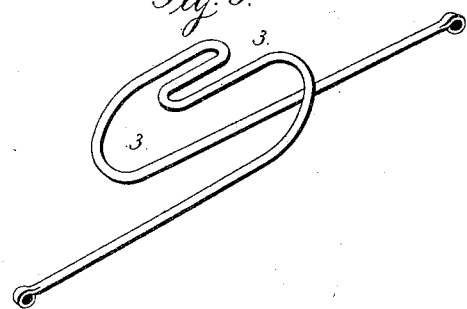
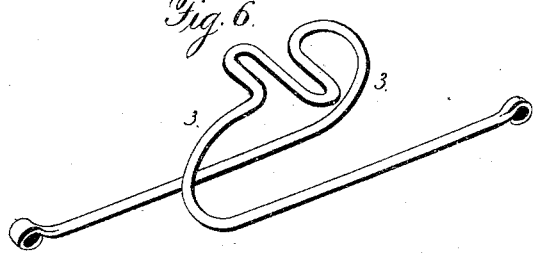
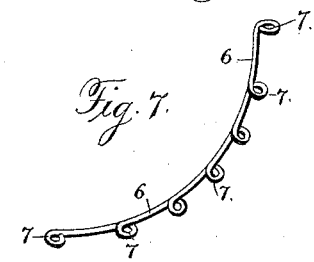
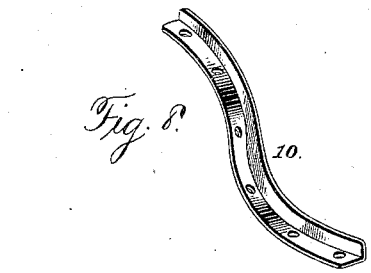
Witnesses:
Jas. E. Hutchinson
G. F. Downing
Inventor:
Edwin Jarrell
By H. A. Seymour Atty

UNITED STATES PATENT OFFICE.

EDWIN JARRELL, OF HARPER, KANSAS.

VEHICLE-SPRING.

SPECIFICATION forming part of Letters Patent No. 411,286, dated September 17, 1889.

Application filed July 20, 1889. Serial No. 318,130. (No model.)

*To all whom it may concern:*

Be it known that I, EDWIN JARRELL, of Harper, in the county of Harper and State of Kansas, have invented certain new and useful Improvements in Vehicle-Springs; and I do hereby declare the following to be a full, clear, and exact description of the invention, such as will enable others skilled in the art to which it appertains to make and use the same.

My invention relates to an improvement in vehicle-springs, and particularly to such as are employed on road-carts or similar two-wheeled vehicles, the object being to provide a durable and yielding spring productive of ease and comfort to the occupant of the vehicle, and, further, to provide an inexpensive spring free of all horse-motion, and one which may be easily replaced in the event of injury or breakage.

With these ends in view my invention consists in certain novel features of construction and combinations of parts, as will be hereinafter described, and pointed out in the claims.

Figure 1:
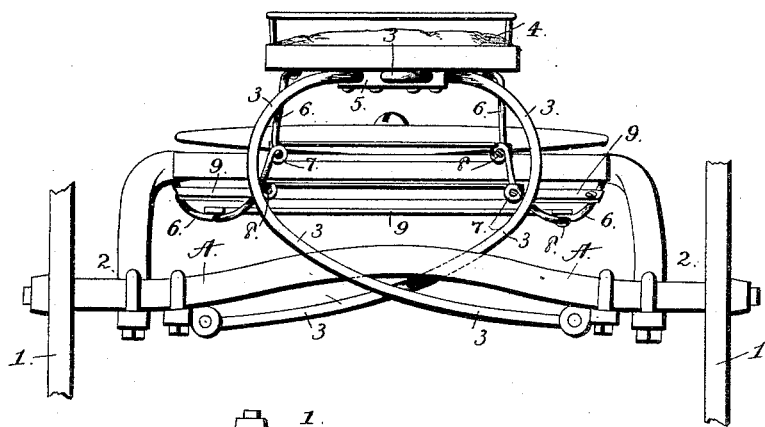
Figure 2:
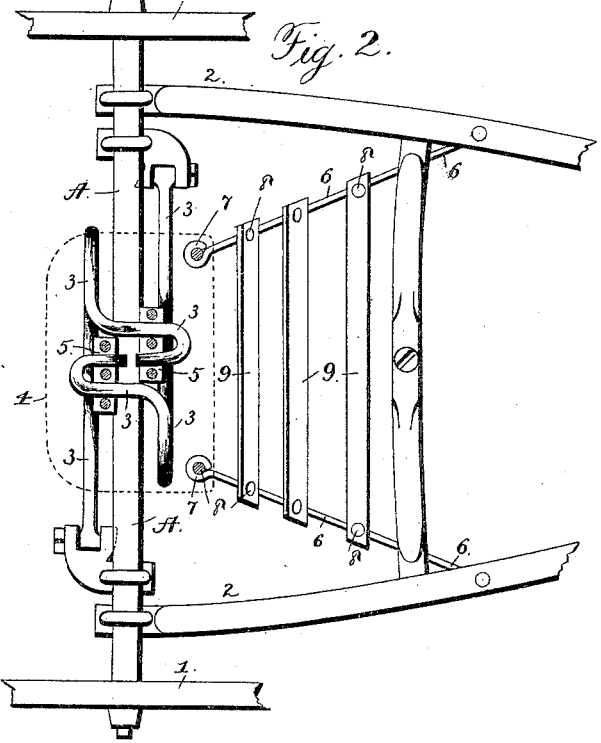

In the accompanying drawings, Figure 1 is a view in perspective of a road-cart with my improved spring applied. Fig. 2 is a plan view with the seat removed. Fig. 3 is a detached view, in perspective, of the springs. Figs. 4, 5, and 6 are similar views of modified forms of springs. Fig. 7 is a view of one of the front springs, and Fig. 8 a view of a rocker-plate.

A represents the axle supported in the accustomed manner in wheels 1 1, and having thills 2 or a pole clipped thereto. An axle-spring 3 straddles the axle, and its lower ends are clipped, shackled, or otherwise secured to the axle, one to the rear and the other in front. This spring is made of spring metal, square, round, or other shape in section, and preferably bent, as shown, in oval or elliptical form in the center, and made in two independent sections of similar shape, being S-shaped at the center when together where the seat 4 rests, and is secured to constitute an extended bearing for the latter, and also to permit the seat to be readily secured thereto at different positions forward or backward relative to the axle to provide for a light or heavy load, respectively.

The spring is made in sections to subserve two purposes—namely, to admit of its being spread apart to receive the axle and avoid contact therewith, and, secondly, to economize in the exigency of the spring becoming broken by necessitating the renewing of only half of the spring, or only one section in case the spring breaks, instead of causing the entire spring to be replaced, as it is very unusual for both of these sections to break. These contiguous ends may be held to the bottom of the seat by means of tie-plates or similar means 5.

Other forms of axle-springs may be employed, such as illustrated in Figs. 3, 4, and 5, in which the essential features are the same; but the springs in all three of these forms are in one piece, in the first it being in the form of a bar of steel bent around at the middle in a vertical plane, with its ends extending by each other in opposite directions.

In Fig. 4 the S-shaped center extends lengthwise, and in Fig. 5 it extends in the opposite direction, or, rather, at right angles to the other.

These springs may be made in different lengths and secured with their ends at different distances apart on the axle, or they may be suspended from the axle or from the shafts by means of shackles, in order to allow a slight lateral swinging motion. These springs cause a soft easy motion without noise. The springs, besides allowing an easy up-and-down motion, also admit of being twisted sidewise in order to prevent any disagreeable horse-motion.

Still another feature of my invention consists in the front springs 6 6. These consist of two bars of metal bent similarly to a half-circle and having eyes 7 7 formed therein by bends in the springs to receive bolts 8 8, which pass through the ends of the slats 9 9, forming the bottom. By thus forming the springs with the spiral eyes therein it admits of the springs being bent or twisted easily with all jars of the vehicle and movements of the horse. If a pole is used instead of thills, these springs are attached to the doubletree near their outer ends, the effect being to arrest the horse-motion of the doubletrees. The construction is such that if the axle-spring receive a sudden shock, the front springs arrest it, and if, on the other hand, the front springs receive a shock, the axle-spring arrests it. As all these springs are so formed by their bends as to be twisted in any direction, a horse may surge and prevent all disagreeable shocks that all two-wheeled vehicles are subject to.

My invention is not necessarily confined to the use of these three springs, as I may discard the two front springs altogether and in lieu thereof use two rocker-plates 10 10. These rocker-plates are bent at a right angle to give strength and rigidity, and they are furnished with holes whereby they are easily attached, and to receive the bolts which hold the bottom slats.

It is evident that slight changes might be resorted to in the form and arrangement of the several parts described without departing from the spirit and scope of my invention, and hence I do not wish to limit myself to the particular construction herein set forth; but, Having fully described my invention, what I claim as new, and desire to secure by Letters Patent, is—

1. The combination, with an axle and a seat or body, of a spring connecting the seat or body with the axle, said spring being bent into oval or elliptical form underneath the seat or body and having its ends bent in opposite direction and made to straddle the axle, one end being secured to the rear of the axle and the other to the front, substantially as set forth.

2. The combination, with an axle and a seat or body, of a spring consisting of two similar sections having enlarged bearings for the seat or body, the said sections, when together, bent into oval or elliptical form and their outer ends extended outward in opposite directions and connected with the opposite sides of the axle, substantially as set forth.

3. The combination, with an axle and seat or body, of a spring having a substantially S-shaped formation in its center, to which the seat or body is adjustably secured, and bent into oval or elliptical form at right angles to the S-shaped portion immediately below the latter, and having its ends extended outward in opposite directions and connected with the axle, substantially as set forth.

4. The combination, with an axle and seat or body, of a spring bent into oval or elliptical form beneath the seat or body and extending downwardly below the axle, front supports secured to the seat or body, and bottom slats secured to said plates, substantially as set forth.

5. The combination, with an axle and a seat or body, of a spring to which the seat or body is secured, said spring being bent into oval or elliptical form beneath the seat or body, with its ends extending outwardly in opposite directions and connected to the axle, and front springs connected to the seat and to the shafts or pole, substantially as set forth.

6. The combination, with an axle and seat or body, of a main axle-spring and a pair of front springs having eyes formed therein by bends in the springs, and slats secured to said springs, substantially as set forth.

7. The combination, with an axle and seat, of a main axle-spring straddling the axle and connected thereto at its ends and a pair of front springs connecting the forward end of the seat, said front springs having eyes bent therein, and slats held to the springs by bolts extending through them into the eyes, substantially as set forth.

In testimony whereof I have signed this specification in the presence of two subscribing witnesses.

EDWIN JARRELL.

Witnesses:
H. W. McMUNN,
PAUL CYPHERS.